United States Patent
Reisdorf et al.

(10) Patent No.: US 6,833,333 B2
(45) Date of Patent: Dec. 21, 2004

(54) WATER RESISTANT FABRIC AND METHOD FOR MAKING

(75) Inventors: Raymond Joseph Reisdorf, Nobressart-Attert (BE); Loic Pierre Rolland, Vesenex-Divonne les Bains (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 182 days.

(21) Appl. No.: 09/866,831

(22) Filed: May 29, 2001

(65) Prior Publication Data

US 2002/0031964 A1 Mar. 14, 2002

Related U.S. Application Data

(60) Provisional application No. 60/207,733, filed on May 26, 2000.

(51) Int. Cl.[7] .................. B32B 27/04; B32B 27/00; B32B 27/40; B05D 3/12; C09J 5/02
(52) U.S. Cl. .................. 442/64; 442/65; 442/66; 442/61; 442/62; 427/358; 427/407.1; 428/424.2; 428/424.8; 156/307.3; 156/307.4
(58) Field of Search .................. 442/61, 62, 64–66, 442/85, 86, 170–172, 71; 427/358, 407.1; 428/297.4, 424.2, 424.8, 147, 190; 156/307.3, 307.4

(56) References Cited

U.S. PATENT DOCUMENTS

| 4,514,463 A | 4/1985 | Alteepping et al. |
| 4,515,852 A | 5/1985 | Katabe |
| 4,560,610 A | 12/1985 | Long |
| 4,589,804 A | 5/1986 | Paeglis et al. |
| 4,631,098 A | 12/1986 | Pithouse |
| 5,030,176 A | 7/1991 | Hodgetts |

FOREIGN PATENT DOCUMENTS

| EP | 0 617 159 | 9/1994 |
| WO | WO 96/09331 | 3/1996 |
| WO | WO 98/47958 | 10/1998 |
| WO | WO 99/01488 | 1/1999 |
| WO | WO 99 63175 | 12/1999 |

Primary Examiner—Terrel Morris
Assistant Examiner—Lynda Salvatore

(57) ABSTRACT

Water resistant laminates that can be useful in end uses requiring a water tight membrane comprising a layer of fabric, wherein a first polymer having a certain stress index that is substantially contained within the fabric layer and a second polymer having a higher stress index than that of the first polymer that can be coated onto one or both surfaces of the fabric.

5 Claims, 1 Drawing Sheet

WATER RESISTANT FABRIC AND METHOD FOR MAKING

This application claims the benefit of Provisional Application No. 60/207,733, filed May 26, 2000.

BACKGROUND OF THE INVENTION

1. Field of the Invention

The current invention relates to improved water resistant laminates that can be useful in end uses requiring a water tight membrane such as roof linings and linings for ponds, pits, tanks, etc.

2. Description of Related Art

It is known to use laminates for making water resistant materials for use as pond liners and the like. For example, Alteepping et al. U.S. Pat. No. 4,514,463 discloses a laminate suitable for use as a pond liner comprising a nonwoven polyolefin fabric having bonded thereto an ethylene butylacrylate copolymer, said copolymer comprising 10–25 weight percent butyl acrylate. The copolymer is forced partially into the nonwoven substrate.

Paeglis et al. U.S. Pat. No. 4,589,804 describes a waterproof membrane comprising an elastomeric sheet, optionally supported on a nonwoven or woven fabric, paper or metal foil, useful as a roof covering, pond, pit or aqueduct liner.

However, it would be desirable to improve the materials such as those described in the references above, particularly for properties such as tear resistance, flexibility, capillary resistance, and water tightness.

BRIEF DESCRIPTION OF THE DRAWINGS

The figure is a schematic sketch of an apparatus for making at least one embodiment of the invention.

SUMMARY OF THE INVENTION

Figure 1:
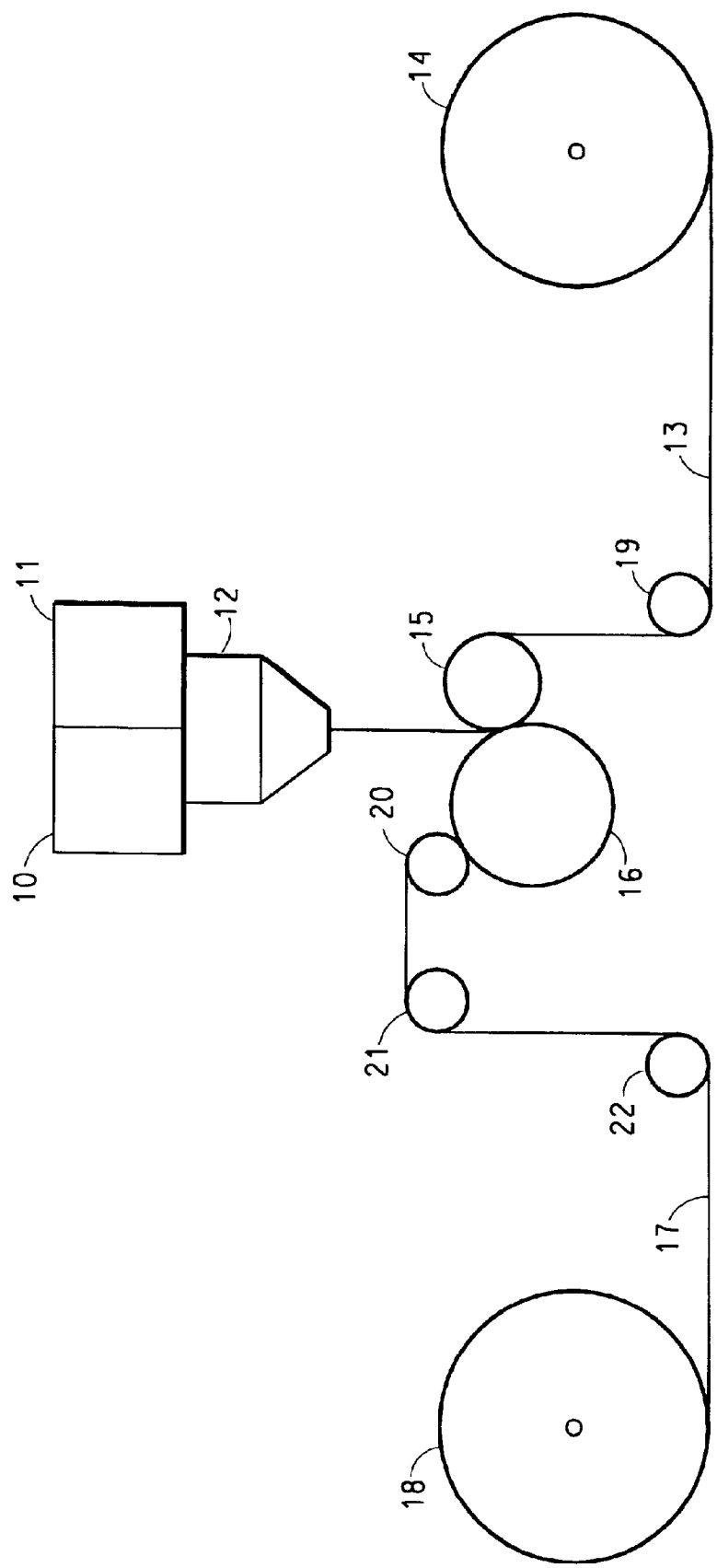

A laminate structure comprising a layer of fabric, wherein a first polymer having a first stress index is substantially contained within the fabric layer and at least one layer of a second polymer coated onto at least one surface of the fabric, the second polymer having a second stress index P higher than the first stress index and method for making the structure.

Definitions

As used herein, the term stress index is the stress required to deform a polymer sample by 20%. The stress strain properties are measured according to DIN 53455 (D-7).

Capillary resistance refers to the resistance of the laminates to penetration by a fluid (e.g. water) into the interstices of the nonwoven layer by capillary action when the laminate is exposed to the fluid. Capillary resistance is measured herein by the number of water droplets observed on a sample after exposure to water under specified conditions for a specified time.

As used herein, the term "spun-bonded material" means nonwoven fabrics formed by filaments which have been extruded, drawn, and then laid on a continuous belt and bonded. Bonding is accomplished by several methods such as by hot-roll calendering or by passing the web through a saturated-steam chamber at an elevated pressure.

DETAILED DESCRIPTION OF THE INVENTION

The laminates of the current invention have high tear resistance, flexibility, capillary resistance, and water tightness. The laminate of the current invention comprises a nonwoven substrate that has been coated with a first polymer composition under conditions that result in substantially complete penetration of the nonwoven substrate by the first polymer composition so that the polymer is substantially completely impregnated into the nonwoven substrate. The first polymer composition can be applied to a surface of the fabric as a layer. As a matter of convenience, the term layer will be used throughout this disclosure to refer variously to the nonwoven substrate, the first polymer composition or to the second polymer composition. However, with respect to the first polymer composition, while it may be referred to as a layer when first coated or otherwise applied onto the fabric layer it would not necessarily be considered as a layer once it is impregnated into the fabric.

The first polymer can be applied by adding a layer at a weight of 15–100 grams per square centimeter to each of the planar surfaces (sides) of the nonwoven layer. This is followed by coating of the first polymer-impregnated nonwoven substrate on at least one side with a second polymer composition. The first and second polymer compositions are selected such that the first polymer composition has a lower stress index than the second polymer composition.

Without being held to any theory, it is believed that the use of a low stress index polymer to impregnate the nonwoven substrate allows the fibers in the nonwoven layer to "move" within the laminate structure, thereby resulting in improved tear strength. By contrast, if the nonwoven substrate were coated with only the second polymer and there is high adhesion with the surface of the nonwoven layer, the fibers in the nonwoven layer would have virtually no freedom of movement and therefore the trapezoidal tear strength would be low. In fact, the laminate formed by coating the nonwoven substrate with the second polymer composition alone (i.e., without the first polymer impregnated into the nonwoven layer) would have a trapezoidal tear strength that is lower than the trapezoidal tear strength of the original nonwoven substrate. Hereafter, trapezoidal tear strength may be referred to simply as tear strength. The laminates of the current invention can achieve trapezoidal tear strengths that are at least as great or in some cases even greater than that of the starting nonwoven substrate. The laminates preferably have a trapezoidal tear strength that is at least 80% of the trapezoidal tear strength of the starting nonwoven, and more preferably at least 90% of the tear strength of the starting nonwoven. Most preferably, the trapezoidal tear strength of the laminate is no less than the trapezoidal tear strength of the starting nonwoven substrate. In some cases, laminates of the invention have trapezoidal tear strengths that are higher than the tear strength of the starting nonwoven substrate. The laminates of the invention are substantially watertight and have improved capillary resistance and delamination strengths compared to laminates formed by coating the nonwoven layer with the second polymer composition alone.

The laminate of the current invention can be prepared by a number of methods known to those of ordinary skill in the art including extrusion coating, extrusion calendering, powder coating and calendering, and deep squeezing with a doctor blade followed by oven curing and calendering. The process may also comprise conventional laminating techniques.

A preferred method is an extrusion coating process wherein the first and second polymer layers are coextruded onto the nonwoven substrate. The figure is a schematic view showing a coextrusion process for the production of a laminate structure in which the nonwoven substrate is coated on both sides with both the first and second polymer compositions. The polymers which will form the first and second polymer layers are melted in extruders 10 and 11 and co-extruded through die 12 as a 2-layer coating onto nonwoven substrate 13 which is unwound from roll 14. The polymer layers are arranged such that the first polymer composition is the first to contact the non-woven substrate. The coated substrate is pressed between nip roll 15 and chill roll 16. The coated laminate 17 is then collected on a wind-up roll 18. Guide rolls 19–22 guide the film from roll 14 to roll 18. The coated laminate can be sent through the process again in order to coat the uncoated side of the non-woven substrate. Alternately, instead of winding up the coated laminate, it may be directed to a second set of extruders, nip, etc., arranged in tandem with the first, in order to coat the uncoated side of the laminate.

A layer of the first polymer composition is coated on each side of the nonwoven substrate so that the first polymer composition completely impregnates the entire thickness of the nonwoven layer. That is, the two layers of the first polymer composition merge inside the nonwoven layer so that there is no region in the middle portion of the nonwoven layer that is substantially devoid of the first polymer. The first polymer composition should be substantially inside the nonwoven substrate after extrusion coating so that the surface of the nonwoven substrate is not coated with the first polymer composition. The quantity of the first polymer composition applied as well as the polymer temperature and back-up roll pressure are adjusted in order to control the penetration of the polymer into the nonwoven layer. By examining the cross section of the laminate using electron microscopy methods known in the art it can be determined whether the nonwoven layer has been completely impregnated by the first polymer composition and whether any significant amount of the first polymer composition remains on the outside surface of the nonwoven.

By adjusting the polymer penetration so that substantially all of the first polymer composition is inside the nonwoven substrate, good adhesion between the second polymer composition and the surface of the nonwoven is achieved. If the extrusion temperature is increased such that it rises above the melting point of the polymer comprising the nonwoven substrate, the bonding level of the fibers in the nonwoven substrate increases, resulting in a decrease in the tear strength of the laminate. The maximum extrusion temperature that can be used without significantly impacting the laminate properties will depend on the operating conditions during the coating process and the polymer comprising the nonwoven. For example, at higher line speeds, higher temperatures can be used than at lower line speeds.

The co-extrusion process can be performed either by simultaneous co-extrusion of the respective layers through independent orifices of a multi-orifice die, and thereafter uniting the still molten layers, or, preferably, by single-channel co-extrusion in which molten streams of the respective polymers are first united within a channel leading to a die manifold, and thereafter extruded together from the die orifice under conditions of streamline flow without intermixing onto the substrate. To coat both sides of the nonwoven substrate it would be necessary to use two extruders arranged in tandem. Alternately, the first polymer composition can be extrusion coated on to each side of the nonwoven substrate to completely impregnate the nonwoven layer followed by a separate extrusion step where the second polymer composition is coated onto one or both sides of the impregnated nonwoven layer.

As noted above, the process may also comprise conventional laminating techniques; for example, lamination of preformed layers of the first and second polymers with the nonwoven substrate. Typically, such lamination techniques would involve thermal lamination of the respective layers on hot roll calendering equipment. The first and second polymeric film layers can be impregnated into the nonwoven layer or laminated, respectively, to the nonwoven layer in a single step or using a multistep process. For example, a layer of the first polymer composition can be applied to each side of the nonwoven substrate at a temperature sufficient to melt the first polymer to achieve a sufficiently low viscosity and at a pressure sufficient to completely impregnate the first polymer into the nonwoven substrate. In a separate step, a layer of the second polymer composition can be laminated to each side of the impregnated nonwoven. Alternately, two laminated polymeric layers, each comprising a layer of the first polymeric composition and a layer of the second polymeric composition, can be laminated to each side of the nonwoven substrate by heating to a temperature sufficient to melt the first polymeric layer and to achieve a sufficiently low viscosity that the polymer melt is able to penetrate into the nonwoven layer and with application of sufficient pressure to force the first polymeric layer substantially completely into the nonwoven substrate. This process results in leaving the second polymer layer on the surfaces of the nonwoven substrate.

A combination of extrusion and lamination techniques may also be used. For example, the first polymeric composition can be extrusion coated onto the nonwoven substrate to completely impregnate the nonwoven substrate and a layer of the second polymeric composition can be laminated onto one or both sides of the impregnated nonwoven substrate. It is also possible to achieve the desired impregnation of the nonwoven by applying the first polymer to only one side of the nonwoven. This can be accomplished if the first polymer is provided in a sufficient amount and with a high enough temperature and pressure.

The nonwoven substrate can comprise a spun-bonded, needled, or stitchbonded material; and can also comprise any carded, air-laid or wet-laid material or any spunbonded-meltblown-spunbonded (SMS) material or combinations thereof. The substrate can be made of any woven or nonwoven fabric that is compatible with the first and second polymers to achieve the desired properties.

The nonwoven substrate is preferably a spun-bonded polyolefin material. In one embodiment of the invention, the substrate comprises at least 50, particularly at least 65, particularly at least 90, and particularly at least 99, weight percent polyolefin fibers, particularly polyethylene or polypropylene. The polyolefin may contain minor amounts of other comonomer units but should contain at least 50, particularly at least 65, particularly at least 90, and particularly at least 99, weight percent of olefin repeating units.

An example of a spun-bonded nonwoven useful in the invention is Typar® spun-bonded polypropylene. Typar® is a registered trademark of E.I. du Pont de Nemours and Company, Wilmington, Del. (DuPont).

The filaments comprising the nonwoven substrate can be formed of a single polymer or alternately the filaments can comprise multicomponent filaments such as bicomponent filaments in a sheath-core or side-by-side arrangement such as polypropylene-polyester bicomponent filaments.

The first polymer composition has a stress index that is less than or equal to about 5 MPa, preferably less than or equal to about 4 MPa and an elongation at break of at least 50%, preferably at least 100%, and most preferably at least 200%. The melting point of the first polymer composition is preferably between about 40° C. and 80° C. If the first polymer composition is a polymer blend having multiple melting points, the highest melting point for the blend is preferably between 40° C. and 80° C. The melt flow index of the first polymer composition is preferably between 1 and 50 g/10 min, preferably between 6 and 12 g/10 min.

Polymers suitable for use in the first polymer composition include ethylene copolymers having a total comonomer content of at least 35 weight percent such as ethylene n-butyl acrylate carbon monoxide, ethylene vinyl acetate, ethylene vinyl acetate carbon monoxide, ethylene butyl acrylate, ethylene n-butyl acrylate glycidyl methacrylate, ethylene ethyl acrylate, ethylene acrylic acid, ethylene ethyl acrylate glycidyl methacrylate, and ethylene methyl acrylate glycidyl methacrylate. Other polymers suitable for use in the first polymer composition are thermoplastic elastomers having a Shore A hardness of less than or equal to 90, measured according to DIN 53505 such as styrene ethylene butylene styrene and polypropylene/EPDM (ethylene propylene diene monomer) rubber. Plain rubbers (fully crosslinked polymers having a Shore A hardness less than or equal to 90) can also be used, as can very soft polyvinylchlorides having a Shore A hardness less than or equal to 90.

The second polymer composition has a stress index that is greater than or equal to about 6 MPa, preferably at least 9 MPa and an elongation at break of at least 100%, preferably at least 500%. The melt flow index of the second composition is between 4 and 20 g/10 min, preferably between 8 and 12 g/10 min. When a co-extrusion process is used, preferably the melt flow index of the first and second polymer compositions are approximately equal to provide substantially linear flow of the polymer through the extrusion dies and resulting in polymer layers which have uniform thickness across the width of the final laminate. If a two-step extrusion process or a lamination process is used, it is not as important that the two polymer compositions have approximately the same melt flow index. The softening point of the second polymer composition is at least 80° C., preferably at least 90° C., and most preferably at least 100° C. In multicomponent blends having multiple softening points, the lowest softening point is at least 80° C., preferably at least 90° C., and most preferably at least 100° C.

The second polymer composition provides the laminate with the strength and durability required for the end uses of interest. A low stress index polymer composition would not be used for this part of the laminate because its mechanical strength and melting point would be too low. The second polymer composition is preferably applied at a weight of at least 50 g/m$^2$ on each side of the nonwoven, more preferably at least 120 g/m$^2$. The amount of second polymer applied will depend on the end use. In general, higher weights result in better abrasion resistance and weldability.

Polymers suitable for use as the second polymer composition include ethylene copolymers such as ethylene vinyl acetate, ethylene butyl acrylate, ethylene ethyl acrylate, ethylene acrylic acid, and ethylene methyl acrylate. Other polyolefins such as linear low density polyethylene, very low density polyethylene, low density polyethylene, high density polyethylene, metallocene polyethylenes, polypropylene homopolymer, and polypropylene copolymers can also be used. Polyvinyl chloride, polypropylene/ethylene propylene diene monomer (EPDM) alloys, and styrene ethylene butylene styrene (SEBS) polymers are also suitable. In general, for ethylene copolymers comprised of the same comonomers, copolymers having lower comonomer content will have a higher stress index. Thermoplastic vulcanizates which are polymer alloys with two phases, a thermoplastic phase and a cross-linked elastomeric phase such as Santoprene®, available from AES or Sarlink®, available from DSM can be used. Also suitable are thermoplastic elastomers such as Hytrel® copolyether ester available from E. I. du Pont de Nemours and Company (Wilmington, Del.), Arnitel® copolyether ester, available from DSM or thermoplastic polyurethanes.

Especially preferred materials for use as the second polymer composition are polymer blends described in published PCT patent applications WO 98/47958, WO 96/09331, and WO 99/01488. WO 99/01488 describes a polymer composition comprising a blend of (1) ethylene n-butyl acrylate glycidyl methacrylate terpolymer containing 30–90 weight percent ethylene, 10–70 weight percent n-butyl acrylate and 0.5–30 weight percent glycidyl acrylate or methacrylate; (2) a polyolefin or rubber selected from the group consisting of (a) ethylene propylene diene methylene rubber (EPDM), (b) a linear low density polyethylene, (c) an ethylene-propylene copolymer, and (d) a very low density polyethylene or a blend thereof; each of which is grafted with 0.05–3 weight percent of a carboxylic acid or any anhydride thereof; and (3) a polyolefin selected from the group consisting of (a) polypropylene homopolymers, (b) very low density polyethylene, (c) linear low density polyethylene; (d) low density polyethylene, (e) high density polyethylene, and (f) ethylene-propylene copolymer. WO 96/09331 describes a polymer composition comprising a blend of (1) ethylene vinyl acetate containing 30–90 weight percent ethylene and 10–70 weight percent vinyl acetate; (2) very low density polyethylene having a specific gravity less than 0.920; and (3) ethylene vinyl acetate carbon monoxide terpolymer containing 30–90 weight percent ethylene, 10–70 weight percent vinyl acetate, and 1–20 weight percent carbon monoxide. WO 98/47958 describes a polymer composition comprising a blend of (1) a polar rubber selected from the group consisting of (a) ethylene vinyl acetate carbon monoxide terpolymer containing 30–29 weight percent ethylene, 10–70 weight percent vinyl acetate and 1–20 weight percent carbon monoxide, (b) acrylonitrile butadiene rubber, (c) acrylate acrylonitrile styrene rubber and (d) ethylene n-butylacrylate carbon monoxide terpolymer containing 30–90 weight percent ethylene, 10–70 weight percent n-butylacrylate and 1–20 weight percent carbon monoxide; (2) ethylene vinyl acetate containing 30–90 weight percent ethylene and 10–70 weight percent vinyl acetate; and (3) a polyolefin selected from the group consisting of (a) linear low density polyethylene having a specific gravity grater than 0.925, (b) low density polyethylene having a specific gravity greater than 0.920, (c) high density polyethylene, (d) polypropylene homopolymer and (e) ethylene-propylene copolymer.

The second polymer composition may be compounded with pigments to provide a colored membrane. Other additives which may be added to the polymer compositions include ultraviolet stabilizers such as carbon black, titanium dioxide, and hindered amine light stabilizers (HALS), flame retardant fillers such as aluminum trihydrate or magnesium hydroxide, and antioxidants such as phenolic antioxidants like Irganox 1010 from Ciba Geigy.

In a somewhat different embodiment the first polymer composition can have a stress index that is less than or equal to about 6 Mpa. In which case, the second polymer composition would have as stress index that is greater than or equal to about 7 Mpa. Ethylene methyl acrylate is an example of a first polymer composition for this embodiment. The second polymer compositions can be any of those presented above providing that the stress index is greater than or equal to about 7 Mpa. The same processes as described above can also be used for making the laminates of this embodiment.

In end uses where multiple membranes are hot welded together for use as linings for liquid containers, ponds, etc., liquid would have a tendency to infiltrate the membranes from the seams at its edges. In the subject invention the first polymer layer reduces the tendency of water or other fluids to penetrate the edge of the laminate through the nonwoven layer by capillary action. Without being held to any theory, it is further believed that the improved capillary resistance of the laminate results in a reduced tendency for the membrane to delaminate in use. Delamination is especially an issue in the case of nonwoven substrates such as spun-bonded nonwovens, which are formed of overlapping layers or webs of filaments produced by banks of multiple spinnerets, and which tend to delaminate between the web layers. Similarly, delamination can be an issue with nonwoven carded webs in which the web is folded over several times in cross machine direction to form the final web in the machine direction. Also, this may occur when several carded webs are superposed one on top of the other to form the final web prior to the bonding process.

As was noted above, in certain end uses it may be necessary to hot-weld two or more sheets together to achieve the desired length and/or width. In such end uses, it is preferable that laminates which have been coated on both sides with the second polymer composition are used. Welding is achieved using methods known in the art such as by overlapping the edges of the two pieces to be joined together (generally by 4–5 cm) and heating the overlapping section using hot air, hot wedge, or high frequency welding techniques.

In a preferred embodiment of the invention, the melting point of the first polymer composition should be low enough to allow easy flow during welding. As such, when the laminate sheets of the invention are seamed together by overlapping and hot-welding, the low melting first polymer composition will re-melt upon heating, ensuring that essentially 100% of the nonwoven fibers are wet by the first polymer composition and thereby providing a membrane having water-tightness through the cross section of the welded sheet edges, resulting in a further improvement in capillary resistance. The melting point of the first polymer should be lower than 200° C., preferably lower that 100° C. and most preferably lower than 60° C.

The thickness of the laminates of the current invention will vary depending on the thickness of the nonwoven and polymer layers and the expected end use. In general, the laminates will have an overall thickness of between 300 micrometers and 2 mm.

Test Methods

The delamination test method is as follows: Remove a strip sample measuring 5 cm wide and 20 cm long. At one end of the strip, using a cutter, separate the strip at midthickness, for a length of about 3 cm. Each of the half-thickness strip portions is then fixed in the upper and bottom clamps of a tensile machine. The test starts with the upper and bottom clamps being separated at a speed of 200 mm/min. The highest value in kg for a displacement of 50 mm is recorded.

Tensile strength and elongation at break of polymer samples are measured according to DIN 53455 (D-VII). The stress index is the stress measured at an elongation of 20%.

Polymer melting point is measured according to ASTM D3418-75.

Polymer softening point is measured according to ISO 306 Method A (Vicat softening point).

Melt flow index is measured according to ASTM D1238 at 190° C. with a weight of 2.16 kg.

Trapezoidal tear strength is measured according to ASTM D4533-85. Except as otherwise noted, the data is reported in kg.

The tensile strength of the laminates (reported in kg) and percent elongation are measured according to ISO/EN 10319.

Capillary effects were measured by cutting a sample of the laminate into a 20 cm×20 cm square and cutting a 5 mm diameter hole in the center of one side. The hole is cut by using carefully a sharp cutter and scraping off the second polymer layer. Care is taken not to cut into the nonwoven layer that is impregnated with the first polymer. The side having the hole thereon is placed under a water head of 150 cm for one hour. The sample is clamped above a water chamber of 150 mm diameter. A special sealing clamp provides absolute water tightness between the sample and the pressurized chamber. The clamp is designed such that it is possible to continuously observe the upper surface of the sample for eventual droplets passing through and also to watch the water droplets around the 4 edges of the sample. After one hour, the number of water droplets on the four edges are counted. The capillary effect is classified as high if there are greater than 10 droplets on each of the four edges, medium if there were more than 3 and less than 10 per edge, low if there were no more than 10 drops on the four edges combined, and none if there were no droplets observed on any of the edges.

Shore A hardness is measured according to DIN 53505.

EXAMPLES

In Examples 1–4 below, the first polymer composition was Elvaloy® HP441, a high elasticity, low tenacity ethylene n-butyl acrylate carbon monoxide terpolymer comprising 30 weight percent of n-butyl acrylate and 10 weight percent of carbon monoxide available from E. I. du Pont de Nemours and Company (Wilmington, Del.). Elvaloy® HP441 terpolymer has melting point of 54° C., a melt flow index of 8 g/10 min, a tensile strength of approximately 9.3 MPa, and an elongation at break of 1200%.

The second polymer composition was Elvaloy NH-1 T29, a blend comprising as follows:

28.9 weight percent Elvaloy® 4924 ethylene vinyl acetate carbon monoxide terpolymer containing 20.5 weight percent vinyl acetate and 8 weight percent carbon monoxide;

16.6 weight percent Elvax® 650 Q ethylene vinyl acetate copolymer containing 12 weight percent vinyl acetate;

16.5 weight percent Elvax® 250 ethylene vinyl acetate copolymer containing 28 weight percent vinyl acetate;

3 weight percent Surlyn® 1652-1 HS ethylene acrylic acid copolymer containing 91 weight percent ethylene;

28.9 weight percent Adflex® X100 G polypropylene (obtained from Montell);

0.1 weight percent Irganox 1010 antioxidant (obtained from Ciba Geigy); and 6.0 weight percent black pigment Masterbatch 102121 (obtained from SNCI, France).

This polymer blend has several melting points, the highest being 140° C. corresponding to the polypropylene component of the blend and the lowest being 72° C. corresponding to the Elvaloy 4924. The polymer blend also has a melt flow index of 9 g/10 min, tensile strength of about 9.3 Mpa, and an elongation at break of 490%. Elvaloy® NH1-T31 was also used a second polymer composition in an example below. Elvaloy® NH1-T31 is available from DuPont and is a mixture of:

59% Bynel, 39% Adflex X100G and 2% green masterbatch.

The non-woven substrate used in the Examples below was Typar® Style 4327 RL spun-bonded polypropylene having the following properties:

| | |
|---|---|
| Basis weight g/m2 | 107 |
| Thickness (micrometer) | 365 |
| Tensile strength | |
| (MD) kg | 15 |
| (XD) kg | 20 |
| Elongation | |
| (MD) % | 15 |
| (XD) % | 20 |
| Trap Tear (MD) kg | 22.7 |
| Trap Tear (XD) kg | 25.9 |

MD = machine direction
CD = cross-machine direction

Unless otherwise indicated, the melt temperature of the polymer during extrusion coating refers to the temperature of the polymer melt at the extruder exit.

Example 1

A laminate was formed according to the method shown in the figure except that a melt-combining block (feed block) was connected to the extruders. The co-extruded layers were combined in the feed block and then passed through the die. The die was a "T-slot" die having a die gap of 0.7 mm and die height of 150 mm. The chill roll was water-cooled at a temperature of 8° C. and the nip roll was constructed of silicone rubber having a hardness of 80 Shore A. Layers of Elvaloy® HP 441 and Elvaloy® NH-1 T29 were co-extruded onto one side of a Typar® substrate using a 3.20 m width Egan extruder with two screws (a 4.5 inch (11.4 cm) diameter screw for the Elvaloy® HP 441 and a 6.5 inch (16.5 cm) diameter screw for the Elvaloy® NH-1 T29) at a line speed of 30 m/min, a melt temperature of 230° C., and a nip pressure of 1 kg/cm². The Elvaloy® HP 441 layer was coated directly onto the Typar® nonwoven substrate and impregnated the substrate and the Elvaloy® NH-1 layer was extruded on the outer surface of the substrate. The second uncoated side of the nonwoven layer was coated by making a second pass through the same equipment. Under these conditions, a laminate having 80 g/m² of Elvaloy® HP 441 and 120 g/m² Elvaloy® NH-1 T29 on each side (the laminate comprising a total of 160 g/m² of Elvaloy® HP 441 impregnated into the substrate and a total of 240 g/m² Elvaloy NH-1 T29 as layers on the substrate) was obtained. The resulting laminate had a trapezoidal tear strength in the machine direction of 21.5 kg and in the cross direction of 29.1 kg, a tensile strength of 27.8 kg in the machine direction and 31.1 kg in the cross direction, an elongation of 20.2% in the machine direction and 21.3 in the cross direction, a delamination strength in the machine direction of 0.8 kg and in the cross direction of 1.01 kg and a capillary rating of low.

Comparative Example A

A laminate was formed according to the method described in Example 1, except that only the 6.5 inch (16.5 cm) diameter screw extruder was used. A layer of Elvaloy® NH-1 T29 was coated on each side of the Typar® substrate by making 2 passes through the process using a line speed of 38 m/min, a melt temperature of 225° C., and a nip pressure of 1 kg/cm². Under these conditions, a laminate having 120 g/m² Elvaloy® NH-1 T29 on each side (the laminate comprising a total of 240 g/m² Elvaloy NH-1 T29) was obtained. The resulting laminate had a trapezoidal tear strength in the machine direction of 17.2 kg and in the cross direction of 26 kg, a tensile strength of 41.2 kg in the machine direction and 44.6 kg in the cross direction, an elongation of 41.6% in the machine direction and 36.9% in the cross direction, a delamination strength in the machine direction of 1.3 kg and in the cross direction of 1.0 kg and a capillary rating of high.

Comparing the properties of the laminate of Comparative Example A to those of Example 1, it is seen that the trapezoidal tear and capillary properties are superior for Example 1.

Examples 2–4

These examples demonstrate the effect of extrusion temperature on laminate properties.

Laminates were formed according to the method shown in the figure except that a melt-combining block (feed block) was connected to the extruders. Layers of Elvaloy® HP 441 and Elvaloy® NH-1 T29 were co-extruded onto one side of the Typar® substrate using a 0.55 m width Egan extruder with two screws (a 2.5 inch (6.35 cm) diameter screw for the Elvaloy® HP 441 and a 3.5 inch (8.9 cm) diameter screw for the Elvaloy® NH-1 T29) at a line speed of 21 m/min, a nip pressure of 1.5 kg/cm², and varying the extrusion temperature between 235° C. and 274° C. The die was a "T-slot" die having a die gap of 0.7 mm and die height of 150 mm. The chill roll was water-cooled at a temperature of 8° C. and the nip roll was constructed of silicone rubber having a hardness of 80 Shore A. Under these conditions, a laminate having 80 g/m² of Elvaloy® HP 441 and 120 g/m² Elvaloy® NH-1 T29 on each side (the laminate comprising a total of 160 g/m² of Elvaloy® HP 441 impregnated into the substrate and a total of 240 g/m² Elvaloy NH-1 T29 as layers on the substrate) was obtained. The results are summarized in Table 1 below. The results show that as the extrusion temperature is increased, the trapezoidal tear strength of the laminate decreases.

TABLE 1

| | Laminate Properties | | |
|---|---|---|---|
| | Example | | |
| | 2 | 3 | 4 |
| Melt temp. (° C.) | 235 | 246 | 274 |
| Trapezoidal Tear Strength (kg) | | | |
| MD | 20.4 | 18.7 | 14.8 |
| XD | 24 | 23.4 | 14.4 |
| Delamination Strength (kg) | | | |
| MD | 2.1 | 2.6 | 3.0 |
| XD | 3.4 | 2.6 | 2.4 |
| Capillary Effect | Low | Low | Low |

Examples 5–6

These examples demonstrate the use of ethyl methy acrylate as the first polymer composition. The EMA is NH-1 5609 available from DuPont.

Laminates were formed according to the method shown in the figure except that a melt-combining block (feed block) was connected to the extruders. The co-extruded layers were combined in the feed block and then passed through the die. The die was a "T-slot" die having a die gap of 0.7 mm and die height of 150 mm. The chill roll was water-cooled at a temperature of 8° C. and the nip roll was constructed of silicone rubber having a hardness of 80 Shore A.

Example 5

In this example, layers of NH-1 5609 and Elvaloy® NH1-T31 were co-extruded onto one side of a Typar® substrate using 2.5 inch (6.35 cm) screw extruders for the NH-1 5609 and 3.5 inch (8.9 cm) screw extruders for the Elvaloy® NH1-T31 at a line speed of 50 m/min, a melt temperature of 250° C., and a nip pressure of 1.5 kg/cm². The NH-1 5609 layer was coated directly onto the Typar® non-woven substrate (basis weight of 90 g/mm2) and impregnated the non-woven layer and then the Elvaloy® NH1-T31 layer was extruded onto the outer surface of the laminate. The second uncoated side of the nonwoven layer was coated by making a second pass through the same equipment. Under these conditions, a laminate having 35 g/m² of Elvaloy® NH1-T31 and 15 g/m² of NH-1 5609 on each side (the laminate comprising a total of 70 g/m² of Elvaloy® NH1-T31 and 30 g/m² NH-1 5609) was obtained. The results are presented in Table 2.

Example 6

In this example, a single layer of NH-1 5609 was extruded onto one side of a Typar® substrate using a 4 m width extruder with a 6.5 inch (16.5 cm) screw at a line speed of 10 m/min, a melt temperature of 230° C., and a nip pressure of 1.5 kg/cm². The NH-1 5609 layer was coated directly onto the Typar® non-woven substrate (basis weight of 107 g/m²) by depositing 200 g/m² on one side and about 80 g/m² were impregnated into the non-woven substrate with about 120 g/m² remaining as a layer on the outer surface. The second uncoated side of the Typar® non-woven substrate was coated by making a second pass through the same equipment. Under these conditions, a laminate was formed having the equivalent of layers totaling 160 g/m² of NH-1 5609 impregnated into the Typar® non-woven substrate and a total of 240 g/m² of NH-1 5609 on the two surfaces. The results are presented in Table 2.

TABLE 2

| Laminate Properties | | |
|---|---|---|
| | Example | |
| | 5 | 6 |
| Melt temp. (° C.) | 250 | 230 |
| Trapezoidal Tear Strength (kg) | | |
| MD | 27.0 | 18.4 |
| XD | 20.3 | 21.8 |
| Delamination | | |

TABLE 2-continued

| Laminate Properties | | |
|---|---|---|
| | Example | |
| | 5 | 6 |
| Strength (kg) | | |
| MD | 0.93 | 2.95 |
| XD | 1.56 | 3.31 |
| Capillary Effect | N.M. | Low |

N.M. means not measured.

We claim:

1. A laminate structure comprising a layer of fabric, wherein a first polymer having a first stress index is completely impregnated within the fabric layer, wherein the surfaces of the fabric are substantially free of the first polymer and at least one layer of a second polymer is coated onto at least one surface of the fabric, the second polymer having a second stress index higher than the first stress index wherein the first polymer has a stress index of about 6 MPa or less and the second polymer has a stress index of least about 7 MPa, wherein the first polymer is ethylene methyl acrylate.

2. A laminate structure comprising a layer of fabric, wherein a first polymer having a first stress index is substantially completely impregnated within the fabric layer, wherein the surfaces of the fabric are substantially free of the first polymer end at least one layer of a second polymer is coated onto at least one surface of the fabric, the second polymer having a second stress index higher than the first stress index, wherein the first polymer is selected from the group consisting of ethylene copolymer having a total comonomer content of at least 35 weight percent; thermoplastic elastomers having a Shore A hardness of 90 or less; fully crosslinked rubber polymers having a Shore A hardness of 90 or less; and polyvinyl chloride having a Shore A hardness of 90 or less.

3. The structure of claim 2, wherein the ethylene copolymer is selected from the group consisting of ethylene n-butyl acrylate carbon monoxide, ethylene vinyl acetate, ethylene vinyl acetate carbon monoxide, ethylene butyl acrylate, ethylene n-butyl acrylate glycidyl methacrylate, ethylene ethyl acrylate, ethylene acrylic acid, ethylene ethyl acrylate glycidyl methacrylate, and ethylene methyl acrylate glycidyl methacrylate.

4. The structure of claim 2, wherein the thermoplastic elastomer is selected from the group consisting of styrene ethylene butylene styrene and polypropylene/ethylene propylene diene monomer rubber.

5. The structure of claim 1 or 2, wherein the second polymer is selected from the group consisting of ethylene copolymer; polyethylene; polypropylene; polyvinyl chloride; polypropylene/ethylene propylene diene monomer and styrene ethylene butylene styrene.

* * * * *